April 7, 1942.   P. A. SCOTT-IVERSEN   2,279,251
FRICTION BRAKE
Filed Aug. 22, 1940   2 Sheets-Sheet 1

Inventor,
P. A. Scott-Iversen
By: Glascock Downing & Seebold
Attys

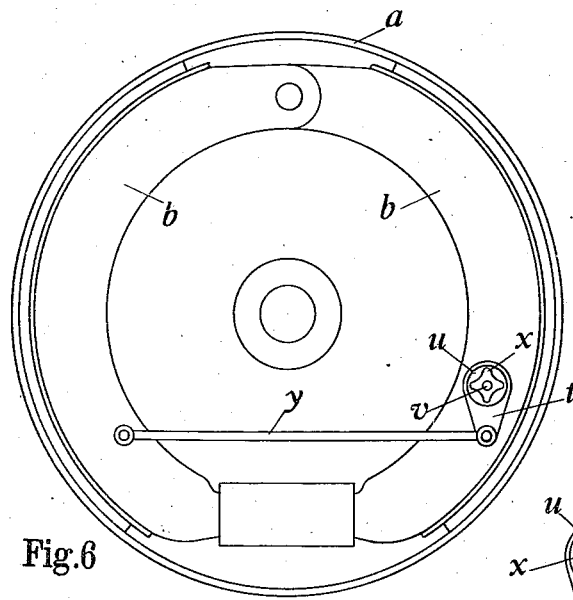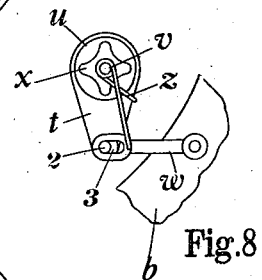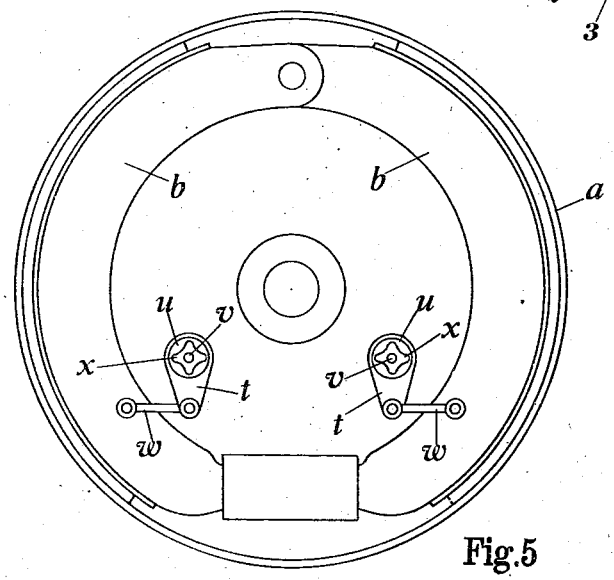

Patented Apr. 7, 1942

2,279,251

UNITED STATES PATENT OFFICE 2,279,251

FRICTION BRAKE

Poul Arne Scott-Iversen, Coventry, England, assignor to The Rover Company, Limited, Coventry, England Application August 22, 1940, Serial No. 353,743
In Great Britain August 23, 1939

13 Claims. (Cl. 188—79.5)

This invention relates to hydraulically operable friction brakes and particularly those used on vehicles. The object of the invention is to provide improved means for compensating automatically the effect of wear or of temperature changes so that the amount of movement required to be imparted to the operating mechanism to bring the brake into action remains substantially constant.

The invention comprises a brake having in combination with a shoe or shoes, a friction stop or stops adapted to hold the shoe or shoes in constant contact with a complementary brake member.

In the accompanying sheets of explanatory drawings—

Figures 2 to 6 illustrate respectively five alternative forms of the invention.

Figures 7 and 8 are fragmentary views illustrating respectively modifications of the examples shown in Figures 4 and 5.

Figure 1:
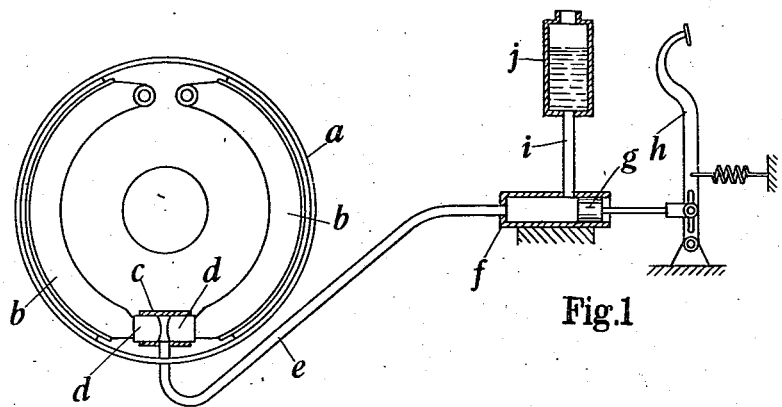
Figure 1 is a diagrammatic view of a vehicle brake to which the invention is applicable.

In Figure 1 $a$ indicates a rotary drum which is provided around its inner periphery with a friction surface, and which is adapted to be mounted in the usual manner on a vehicle road wheel. Within the drum $a$ are pivotally mounted a pair of brake shoes $b$ having friction surfaces adapted to co-operate with the friction surface of the drum. Between the free ends of the shoes $b$ there is mounted a fixed hydraulic cylinder $c$ containing a pair of oppositely movable pistons $d$ adapted to exert pressure on the adjacent free ends of the shoes. At a position between the pistons $d$ the cylinder $c$ is connected by a pipe $e$ to a cylinder $f$ containing a piston $g$, the latter being operable by a pedal $h$ or other lever for exerting a brake-applying force on the pistons $d$ through the medium of liquid contained in the cylinder $f$, pipe $e$ and cylinder $c$. When the piston $g$ is in its initial or idle position as shown the interior of the cylinder $f$ communicates through a pipe $i$ with a replenishing chamber $j$ containing brake actuating liquid, this communication being interrupted by the piston $g$ when the latter is actuated for applying the brake.

Figure 2:
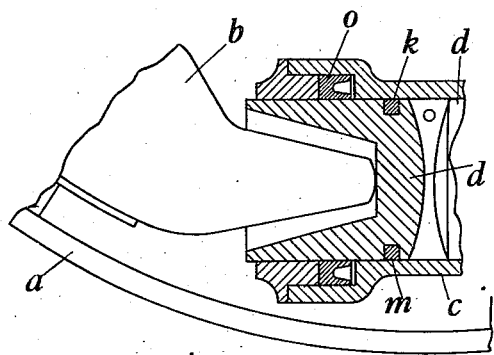

In applying the invention to the brake shown in Figure 1, I may combine with each piston $d$ any convenient friction device whereby the piston can serve also as a stop for preventing retraction of the corresponding shoe $b$ from the drum $a$. Thus, as shown in Figure 2, I mount in a circumferential groove $k$ in the piston $d$, a spring ring $m$ adapted to exert a frictional grip on the inner peripheral surface of the cylinder $c$. The ring $m$ is arranged to fit the groove $k$ closely so that little or no axial freedom exists between the ring and piston. The frictional grip exerted by the ring $m$ on the cylinder $c$ is made sufficient to prevent the shoe $b$ from moving out of contact with the drum $a$ when the brake-applying force has been removed, but it is not sufficient materially to resist the brake-applying force. The free end of the shoe $b$ is held in contact with the piston $d$ either by gravity or by a spring (not shown) which acts in the opposite direction to the brake applying force but is not sufficiently strong to overcome the frictional grip of the ring $m$ on the cylinder $c$ when the brake-applying force is removed. In either case the brake is such that in the absence of the friction stops formed by the rings as $m$ the shoes $b$ would tend to move away from the drum $a$ when the brake-applying force is removed.

When the brake is applied the shoes $b$ are pressed against the drum $a$ in the usual manner for producing the required braking effect. On releasing the brake, the shoes $b$ do not, however, become separated from the drum $a$, but remain lightly in contact with it, the resistance offered by the shoes in this condition being insufficient to cause any inconvenience.

It will be apparent that wear of the shoes $b$ or drum $a$ has no effect on the movement required in the operating mechanism to bring the brake into action as the shoes are in constant contact with the drum. Moreover, contraction of the drum $a$ on the shoes $b$ due to a fall of temperature has no binding effect as the friction stops formed by the rings as $m$ allow the shoes to yield. Separation of the interacting surfaces of the drum $a$ and shoes $b$ due to expansion of the drum with a rise of temperature is eliminated with the next application of the brake-applying force.

To prevent leakage of fluid between the cylinder $c$ and pistons $d$, each of these pistons is embraced by a leather or other flexible packing ring $o$ of channel section arranged in a circumferential recess formed in the inner peripheral wall of the cylinder.

Figure 3:
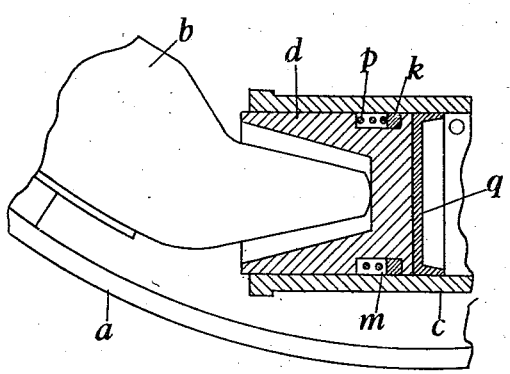

If desired the groove $k$ formed in each piston $d$ for accommodating the corresponding spring ring $m$ may be of greater width than the ring, and a helical compression spring $p$ may be arranged in that part of the groove not occupied by the ring as shown in Figure 3. the ring being held by the spring in contact with the side of the groove remote from the corresponding shoe $b$ so that the action of the brake applying force has no effect on the spring, the latter serving merely as a medium through which the ring serves to prevent retraction of the shoe from the drum $a$. In this example leakage of fluid between the cylinder $c$ and piston $d$ is prevented by a leather or other flexible packing disc $q$ secured to the inner end of the piston and having a flanged peripheral portion in contact with the inner peripheral wall of the cylinder.

Figure 7:
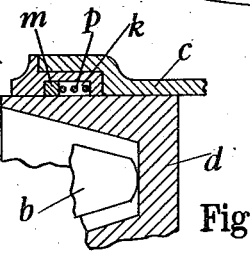
Figure 4:
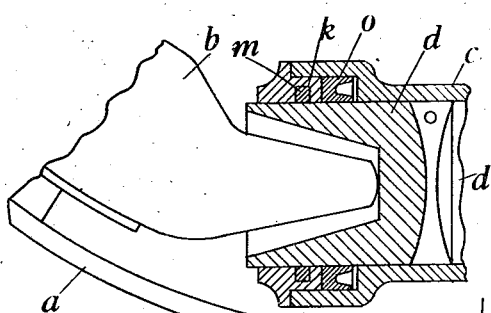

Instead of being mounted as above described in grooves in the pistons $d$, the spring rings as $m$ may be mounted in circumferential grooves as $k$ formed around these pistons in the inner peripheral wall of the cylinder $c$ as illustrated in Figure 4, in which case each ring is adapted to exert a sufficient frictional grip on the corresponding piston to prevent retraction of the adjacent shoe $b$ without offering material resistance to the brake-applying force. In other respects the example shown in Figure 4 is similar to that shown in Figure 2. But if desired the spring ring $m$ shown in Figure 4 may be loaded by a helical compression spring $p$ (similar to that employed in Figure 3) arranged in the groove $k$ containing the ring. This modification is shown in Figure 7 in which the groove $k$ is of greater width than the ring, and the spring $p$ is situated in the side of the groove remote from the shoe $b$, so that the action of the brake-applying force has no effect on the spring, the latter serving merely as a resilient abutment for opposing movement of the ring by the shoe.

Instead of employing a fixed hydraulic cylinder and a pair of oppositely movable pistons as above described, I may employ a cylinder having a closed end connected to one of the shoes, and a single piston mounted in the cylinder and operatively associated with the other shoe. In this case only one spring ring as above described is required for preventing retraction of the shoes.

Whilst it is preferred to employ friction stops in the form of spring rings as above described, these friction stops may take a variety of forms. Thus, as shown in Figure 5, each friction stop may have the form of an arm $t$ pivotally mounted between friction discs or members as $u$ on a fixed supporting spindle $v$, and having its outer end connected by a link $w$ to the adjacent shoe $b$ so that movement of the latter is accompanied by pivotal movement of the arm. The friction discs or members $u$ are adapted under the action of spring washers $x$ to exert a sufficient frictional grip on the arms $t$ to prevent retraction of the shoes $b$ from the drum $a$ without offering material resistance to the brake-applying force.

If desired each arm $t$ may be adapted to prevent retraction of the corresponding shoe $b$ through the medium of a spring $z$ as shown in Figure 8. In this case the outer end of the arm $t$ is connected to the link $w$ by a projection 2 on the arm engaging a slot 3 in the link. The spring $z$ has the form of a wire which at a position intermediate its ends is looped or wound around the pivot spindle $v$ of the arm $t$, and at its opposite ends is anchored to the arm and link respectively, the arrangement being such that the arm projection 2 is normally held by the spring in the end of the slot 3 remote from the shoe $b$. Consequently the action of the brake-applying force on the shoe $b$ has no effect on the spring $z$, and the latter serves as a medium through which retraction of the shoe is prevented by the arm $t$. The anchorage of the spring $z$ to the link $w$ is effected by bending over the appropriate end of the spring into engagement with a corresponding hole in the link.

Instead of employing a pair of arms $t$ as above described for preventing retraction of the shoes $b$, only one such arm may be employed as shown in Figure 6, this arm being mounted between friction discs or members as $u$ on a supporting spindle $v$ carried by one of the shoes $b$, and the outer end of the arm being connected by a link $y$ to the other shoe. If desired the arm $t$ shown in Figure 6 may be adapted to prevent retraction of the shoes $b$ through the medium of a spring similar to that shown in Figure 8.

The invention is not limited to the examples above described as the construction and arrangement of the friction stops may be varied in a number of ways. But in all cases the normal tendency of the shoes to move out of contact with the complementary brake member formed by the drum when the brake-applying force is released is counteracted by the friction stops.

I am aware that friction stops adapted to maintain a substantially constant clearance space between the shoes and drum when the brake is not in action are well known. My invention differs in that my friction stops are adapted to eliminate clearance between the friction surfaces of the brake.

Having thus described my invention what I claim as new and desire to secure by Letters Patent is:

1. A hydraulically operable friction brake having in combination at least one shoe, a complementary brake member with which the shoe can co-operate, and at least one friction stop which serves to hold the shoe in constant light contact with the complementary brake member when the brake is idle.

2. A brake as claimed in claim 1 and having in combination with the friction stop, a spring adapted by co-operating with the said stop to oppose retraction of the shoe from the complementary brake member.

3. A brake as claimed in claim 1, in which the friction stop is combined with a hydraulic device for actuating the brake.

4. A hydraulically operable friction brake having in combination at least one shoe, a complementary brake member with which the shoe can co-operate, at least one hydraulically operable piston adapted to actuate the shoe and provided with a circumferential groove, a hydraulic cylinder containing the piston, and at least one friction stop in the form of a spring ring mounted in the groove in the piston and adapted by exerting a frictional grip on the cylinder to hold the shoe in constant light contact with the complementary brake member when the brake is idle.

5. A brake as claimed in claim 4 and having in combination with the spring ring, a spring also arranged in the groove in the piston and adapted by co-operating with the said ring to oppose retraction of the shoe from the complementary brake member.

6. A hydraulically operable friction brake having in combination at least one shoe, a complementary brake member with which the shoe can co-operate, at least one hydraulically operable piston adapted to actuate the shoe, a hydraulic cylinder containing the piston and having in its inner peripheral surface a circumferential groove which surrounds the piston, and at least one friction stop in the form of a spring ring mounted in the groove in the cylinder and adapted by exerting a frictional grip on the piston to hold the shoe in constant light contact with the complementary brake member when the brake is idle.

7. A brake as claimed in claim 6 and having in combination with the spring ring, a spring also arranged in the groove in the cylinder and adapted by co-operating with the said ring to oppose retraction of the shoe from the complementary brake member.

8. A brake as claimed in claim 1, in which the friction stop has the form of a pivotal friction device connected to the shoe.

9. A brake as claimed in claim 1, in which the friction stop has the form of a pivotal friction device connected to the shoe, and has in combination with it a spring adapted by co-operating with the said device to oppose retraction of the shoe from the complementary brake member.

10. A brake as claimed in claim 1, in which the friction stop comprises the combination of a pivotal arm mounted on a fixed axis, a link connecting the arm to the shoe, and means adapted to exert a frictional grip on and thereby oppose pivotal movement of the arm.

11. A brake as claimed in claim 1, in which the friction stop comprises the combination of a pivotal arm mounted on a fixed axis, a link connecting the arm to the shoe, and means adapted to exert a frictional grip on and thereby oppose pivotal movement of the arm, the latter having combined with it a spring adapted by co-operating with the arm to oppose retraction of the shoe from the complementary brake member.

12. A brake as claimed in claim 1, in which a pair of shoes and a single friction stop are provided, and in which the friction stop comprises the combination of a pivotal arm mounted on one of the shoes, a link connecting the arm to the other shoe, and means adapted to exert a frictional grip on and thereby oppose pivotal movement of the arm.

13. A brake as claimed in claim 1, in which a pair of shoes and a single friction stop are provided, and in which the friction stop comprises the combination of a pivotal arm mounted on one of the shoes, a link connecting the arm to the other shoe, and means adapted to exert a frictional grip on and thereby oppose pivotal movement of the arm, the latter having combined with it a spring adapted by co-operating with the arm to oppose retraction of the shoes from the complementary brake member.

POUL ARNE SCOTT-IVERSEN.